(12) United States Patent
Saru et al.

(10) Patent No.: US 9,712,567 B2
(45) Date of Patent: Jul. 18, 2017

(54) VOICE OVER INTERNET PROTOCOL (VOIP) SYSTEMS, METHODS, NETWORK ELEMENTS AND APPLICATIONS

(75) Inventors: Sami Saru, Turku (FI); Janne Aaltonen, Turku (FI); Ismo Antikainen, Masala (FI)

(73) Assignee: Apple Inc., Cupertino, CA (US)

(*) Notice: Subject to any disclaimer, the term of this patent is extended or adjusted under 35 U.S.C. 154(b) by 1395 days.

(21) Appl. No.: 12/744,687

(22) PCT Filed: Dec. 1, 2008

(86) PCT No.: PCT/EP2008/066513
§ 371 (c)(1),
(2), (4) Date: Dec. 23, 2010

(87) PCT Pub. No.: WO2009/068681
PCT Pub. Date: Jun. 4, 2009

(65) Prior Publication Data
US 2011/0096771 A1    Apr. 28, 2011

(30) Foreign Application Priority Data

Nov. 29, 2007  (GB) .................................. 0723388.5
Jul. 2, 2008    (GB) .................................. 0812059.4

(51) Int. Cl.
*H04L 29/06*    (2006.01)
(52) U.S. Cl.
CPC ...... *H04L 65/1069* (2013.01); *H04L 65/1066* (2013.01); *H04L 65/1073* (2013.01); *H04L 65/1076* (2013.01)

(58) Field of Classification Search
CPC ............ H04L 65/1066; H04L 65/1069; H04L 65/1073; H04L 65/1076; H04L 65/1079
USPC ................................................. 370/352–356
See application file for complete search history.

(56) References Cited

U.S. PATENT DOCUMENTS

| 6,282,192 | B1 | 8/2001 | Murphy et al. |
| 6,865,266 | B1 | 3/2005 | Pershan |
| 2005/0190721 | A1* | 9/2005 | Pershan ..................... 370/328 |
| 2005/0197105 | A1* | 9/2005 | McCann .................... 455/412.1 |
| 2005/0286466 | A1* | 12/2005 | Tagg et al. ................. 370/329 |
| 2006/0193459 | A1 | 8/2006 | Cadiz et al. |
| 2007/0167167 | A1 | 7/2007 | Jiang |
| 2008/0130856 | A1* | 6/2008 | Ku et al. .................. 379/201.01 |

(Continued)

FOREIGN PATENT DOCUMENTS

EP           1596566          11/2005

OTHER PUBLICATIONS

International Search Report for International Patent Application No. PCT/EP2008/066513 mailed Jul. 13, 2009.

(Continued)

*Primary Examiner* — Khaled Kassim
(74) *Attorney, Agent, or Firm* — Meyertons, Hood, Kivlin, Kowert & Goetzel, P.C.

(57) ABSTRACT

In accordance with at least one embodiment of the invention, methodologies and mechanisms are provided that enable methods, systems and software for supporting or implementing functionality to intercept a phone call and/or data transmission in a cellular network and direct it to at least one receivers' VoIP account if the account is active and provides VoIP connectivity.

17 Claims, 6 Drawing Sheets

(56) References Cited

U.S. PATENT DOCUMENTS

2008/0182565 A1* 7/2008 Lazaridis et al. ............ 455/417

OTHER PUBLICATIONS

Written Opinion of the International Search Authority for International Patent Application No. PCT/EP2008/066513 mailed Jul. 13, 2009.
TS 32 140 Editor: "Draft TS 32.140", 3GPP Draft; S5-010531-Draft-32140, 3rd Generation Partnership Project (3GPP), Mobile Competence Centre; 650, Route Des Lucioles; F-06921 Sophia-Antipolis Cedex; France, vol. CN WG4, No. Brighton; 20011015, Sep. 6, 2001 (Sep. 6, 2001), XP050079735, p. 50.

* cited by examiner

VOICE OVER INTERNET PROTOCOL (VOIP) SYSTEMS, METHODS, NETWORK ELEMENTS AND APPLICATIONS

CROSS-REFERENCE TO RELATED APPLICATIONS

The present application claims the benefit of priority to International Application No. PCT/EP2008/066513 filed 1 Dec. 2008, United Kingdom Patent Application No. GB 0812059.4 filed 2 Jul. 2008, and United Kingdom Patent Application No. GB 0723388.5 filed 29 Nov. 2007, the contents of which are incorporated herein by reference in their entirety.

The invention relates in general to communication via cellular and Voice over Internet Protocol (VoIP) networks. In particular, the invention relates to supporting or implementing functionality to intercept a phone call and/or data transmission in a cellular network and direct it to at least one receivers' VoIP client.

BACKGROUND OF THE INVENTION

VoIP service enables voice communication carried over Internet networks. VoIP is also conventionally referred to as Internet Protocol (IP) Telephony, Internet telephony, Broadband telephony, Broadband Phone and Voice over Broadband. A typical arrangement for a VoIP service is to use a dedicated VoIP client in a user's terminal, which may be, for example, a personal computer. The introduction of smart phones (i.e., a cellular phone that can connect to the Internet for tasks like Web browsing and sending and receiving e-mail) has also enabled making of VoIP calls using mobile devices.

The overwhelming popularity of mobile devices such as smart phones has opened up the possibility of using mobile devices and related communication infrastructure as a media for providing what may be referred to as "mobile marketing" to potential consumers. Mobile marketing involves and relates to marketing and advertising via mobile devices, e.g., mobile phones, smart phones, and Personal Data Assistants (PDAs), or any other computer device configured to be able to receive or send data wirelessly, receiving promotional content, e.g., marketing and/or advertising content in the form of, e.g., text, audio, video or some combination thereof associated with a particular product, service or combination thereof.

Mobile marketing is considered by advertisers as the next new channel to directly reach potential consumers. Mobile marketing enables advertisers to directly reach individual consumers in a targeted way. This is because the nature of mobile media is personal, in that mobile devices are generally used by a particular individual rather than a group of individuals. Further, mobile media is, by definition, mobile, which offers a transportable mechanism for exposing potential consumers to advertising content. Moreover, because mobile media is "always on," advertisers are not constrained by the need to make a connection in order to deliver promotional content to a user's device because a connection is always established with a user's mobile device (provided the mobile device is in range of an available communication network). As an additional benefit of mobile media as an advertising mechanism, mobile media enables groups of individuals to form wherein the group members communicate actively with each other. As a result, these characteristics combined with social networks-based marketing approach of the Internet may form a very powerful base to execute marketing strategies.

However, executing such marketing strategies and promotional campaigns is difficult and expensive when mobile marketing functionality is to be delivered to individuals via one or more mobile networks with differing technical and operational functionality and requirements, particularly when, VoIP networks and cellular networks are involved and individuals can receive promotional content via VoIP networks and/or cellular networks.

Moreover, cellular network infrastructure is expensive for service level operators to implement, while heavy traffic in the network leads to network congestion. In order to maintain sufficient capacity, operators must either add more capacity (e.g., requiring installation of additional base stations) or increase the price of air time in the network during the busy hours to direct people to use services at off peak hours.

Further, the ever present end user costs for using a cellular network deter effective mobile marketing. Such costs include both the delivery cost of SMS/MMS message transmission to a recipient over the cellular network and cost of voice traffic, i.e. connecting a call to a receiver. Conventionally, such costs must be absorbed wholly or in part by service level operator and/or network provider as part of free or subsidized mobile phone service/product offerings.

MMS, also known as picture messaging, is a widely used service with mobile phone users. Picture messaging refers to the sending of an image, e.g., a photograph produced by a mobile phone, to another mobile phone or to a server or electronic-mail account. Conventionally, the images are sent in some predetermined picture format, e.g., Joint Picture Expert Group (JPEG). In addition to pictures, MMS messages might compose of video, audio, hypertext, links, etc.

A problem in executing mobile marketing strategies results when mobile advertising functionality is to be integrated into one or more communication networks with differing technical and operational functionality and requirements. This is a particular problem when, for example, cellular, that is CDMA or GSM, are available for distributing promotional content as well as VoIP networks. This is because communication via VoIP is initiated and managed in a different manner than for communication via Public Switch Telephone Network (PSTN) or a cellular network.

A MVNO is a company that provides cellular service but does not have its own allocation of the radio frequency spectrum or the infrastructure required to provide mobile telephone service. Unlike Mobile Network Operator (MNOs), who have frequency allocation(s) and infrastructure, MVNOs can be thought of as "switchless resellers" of the traditional landline telephone market, who buy minutes wholesale from large long distance companies and retail them to their customers.

Conventionally, an MNO that does not have a frequency spectrum allocation in a particular geographical region may operate as an MVNO in that region. Thus, an MVNO's roles and relationship to an MNO vary by market, country and the individual situations of the MNO and MVNO. In general, an MVNO is an entity or company that works independently of an MNO and can set its own pricing structures, subject to the rates agreed with the MNO. Conventionally, MVNOs often do not own any GSM, CDMA or other core mobile network related infrastructure, such as Mobile Switching Centers (MSCs), or a radio access network. Although some may own their own Home Location Register, or HLR, which allows more flexibility and ownership of the subscriber's mobile phone number (MSISDN); in such an implementation, a MVNO may appear as a roaming partner to other networks abroad, and as a "network" within its own region.

The cost of mobile marketing strategies can be very expensive if only a PSTN or cellular network is available for transmitting promotional content to users. The ever present end user costs for using a cellular network include both the delivery cost of delivering promotional content in various contents and formats, e.g., SMS/MMS message transmission, to a recipient over the cellular network and also cost of voice traffic, i.e. connecting a call to a receiver.

As such costs must be absorbed wholly or in part by the service level operator and/or network provider as part of free or subsidized mobile phone service/product offerings, at least one embodiment of the invention provides the ability to intercept a phone call and/or data transmission in a cellular network and redirect it to at least one receivers' Voice over Internet Protocol (VoIP) account if the VoIP account is active. Accordingly, a user's telephone call made via a mobile phone may be redirected in whole or in part to the original receiver but by their VoIP account rather than a conventional and originally intended mobile phone Integrated Services Digital Network (ISDN).

As explained briefly above, VoIP is the routing of voice conversations over the Internet or through any other IP-based network. This routing is the process of selecting paths in one or more networks along which to send data or physical traffic. Companies providing VoIP service are commonly referred to as "VoIP providers," and protocols which are used to carry voice signals over an IP network are commonly referred to as "VoIP protocols." Thus, VoIP providers such as Vonage™ or Skype™ provide the capability to initiate and receive voice calls via VoIP; these service providers utilize proprietary closed VoIP networks. In addition to such proprietary systems, various industry standards also enable interoperability of VoIP networks. One example of such a standard is the Internet Engineer Task Force (IETF) proposal RFC3261, "SIP: Session Initiation Protocol," (SIP) which may be used for signalling purposes between VoIP clients which are initiating, carrying on or terminating a VoIP session, which is the voice communication between a plurality of VoIP clients.

Products such as VoIP phones (hardware that provides a handset and software sufficient to provide a VoIP client recognized by a VoIP network) can integrate with other services available over the Internet, including video conversation, message or data file exchange in parallel with the conversation, audio conferencing, managing address books and passing information about whether other users are available online to interested parties.

However, while POTS and mobile phone networks may share common global standards which allocate and identify specific telephone lines, there is no widely adopted similar standard for VoIP networks. Further, although some VoIP networks allocate an telephone number that can be used for VoIP as well as incoming/external calls, there are often different, incompatible schemes when calling between VoIP providers which use provider specific short codes.

As a result, telecommunications companies are developing IP Multimedia Subsystems (IMSs) which are anticipated to merge Internet technologies with the mobile world, using a pure VoIP infrastructure. Thus, in theory, telecommunications companies will be able to upgrade their existing systems while embracing Internet technologies such as the Web, electronic mail, Instant Messaging (IM), presence, and video conferencing as well as allow existing VoIP networks to interface with conventional PSTN and mobile devices. Therefore, the convergence of VoIP technology and other types of voice communication networks is increasing.

Moreover, because VoIP is location independent (only an Internet connection is needed to get a connection to a VoIP provider), mobile phone makers providing smart phones are now developing "dual mode" telephone sets, which allow for the seamless handover between a cellular network and a WiFi network.

VoIP Mobile, or Mobile Voice over Internet Protocol, is the application of VoIP technology to mobile devices. VoIP Mobile requires a mobile device that supports, at a minimum, high speed Internet Protocol (IP) communications. This may be provided, e.g., using Voice over Wi-Fi or VoWi-Fi, but the same protocols (e.g., SIP) can be used over any broadband IP-capable wireless network connection such as the various 3 G standards or potentially WiMAX. Mobile VoIP relies on two main technologies: the Unlicensed Mobile Access (UMA) Generic Access Network, designed to allow VoIP to run over a GSM cellular backbone; and SIP, the standard used by most VoIP services.

Similarly, MoIP, or mobile communications over IP, is the mobilization of peer-to-peer communications including chat and talk using IP via standard mobile communications applications including 3 G, GPRS and Wifi. Unlike mobile VoIP, MoIP is not a VoIP client made accessible from mobile devices or a switchboard application using VoIP in the background. Rather, MoIP is a native mobile application on users' mobile devices and used to conduct talk and chat over the internet connection as its primary channel.

Regardless of the various implementations for combining IP, VoIP and cellular and PSTN technology, the resulting combination of technologies increases the number of different distribution channels for marketing, advertising and CRM. As a result, there is also an increasing need for technology for developing and implementing mobile marketing strategies such as CRM to be implemented over a variety of distribution channels.

Moreover, the availability of communicating with consumers/customers via VoIP and providing subsidized or free service campaigns via VoIP rather than via mobile networks reduces the cost of implementing such campaigns because IP and VoIP is typically less expensive than voice via mobile networks. For example, VoIP in-network calls may be made for free or at a reduced fee.

Therefore, effective execution of mobile marketing strategies in an environment where customers and consumers have access to VoIP, cellular and PSTN networks requires management of differing technical and operational functionality and requirements. This is particularly true because promotional content may be in the form of SMS, IM, MMS, electronic mail, voice data, video, text, etc. However, by utilizing VoIP, to communicate with consumers/customers reduces the cost of such strategies. Nevertheless, effective distribution of such promotional content via VoIP requires complex and pervasive monitoring and analysis of customer/recipient capabilities and connections with one or more communication networks including VoIP and cellular.

SUMMARY OF THE INVENTION

In accordance with at least one embodiment of the invention, methodologies and mechanisms are provided that enable methods, systems and software for supporting or implementing functionality to intercept a phone call and/or data transmission in a cellular network and direct it to at least one receivers' VoIP account if the account is active and provides VoIP connectivity, as specified in the independent claims. This is achieved by a combination of features recited in each independent claim. Accordingly, dependent claims prescribe further detailed implementations of the present invention.

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

BRIEF DESCRIPTION OF THE DRAWINGS

A more complete understanding of the present invention and the utility thereof may be acquired by referring to the following description in consideration of the accompanying drawings, in which like reference numbers indicate like features, and wherein.

DETAILED DESCRIPTION OF THE INVENTION

In the following description of various invention embodiments, reference is made to the accompanying drawings, which form a part hereof, and in which is shown, by way of illustration, various embodiments in which the invention may be practiced.

As described above, embodiments of the invention provide methodologies and mechanisms that enable implementation of free or subsidized communication services to end users as well as mobile marketing, advertising and CRM campaign implementation opportunities. Such implementations can comprise a combination of communications via VoIP and other communication networks in a manner that establishes a long-term, engaging relationship between a customer (or a recipient, which is merely a potential customer) and a promotion company or advertiser.

Figure 1:
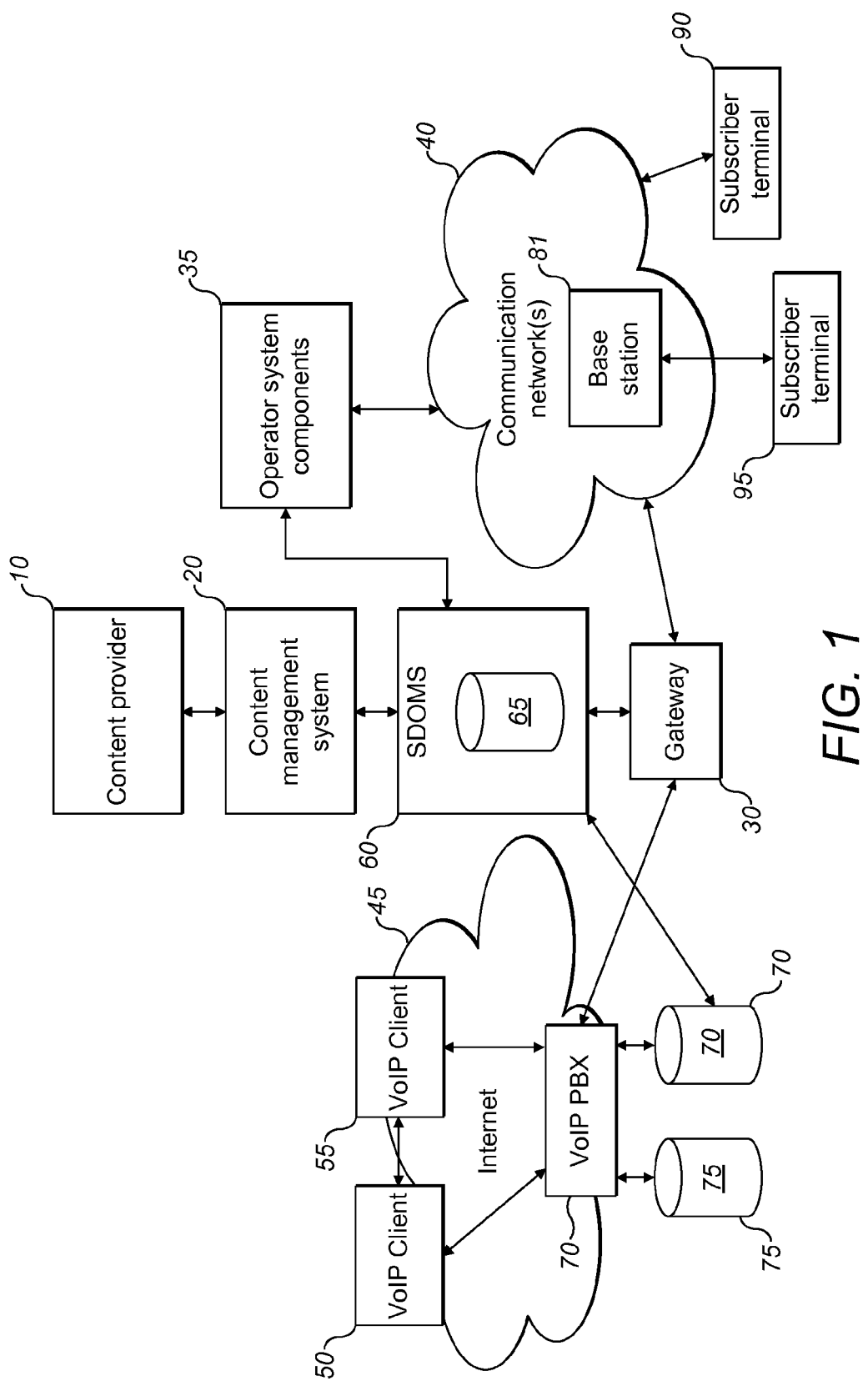
FIG. 1 illustrates an environment wherein embodiments of the invention may be utilized.

FIG. 1 illustrates an environment 100 wherein embodiments of the invention may be utilized to provide subsidized or free communications and/or data services and/or mobile marketing which reaches a plurality of consumers/customers via a plurality of VoIP clients 50, 55 and/or subscriber terminals 90, 95 via a plurality of different types of networks, e.g., Internet 45 and one or more communication networks 40. As illustrated in FIG. 1, a content provider 10 (which may be an advertiser, advertising firm, media agency, operator, consultancy company, promotion company or other similar entity interested in implementing, managing or determining the efficacy of a marketing or advertising campaign) may access an content provider system (CMS) 20 (also illustrated in further detail in FIG. 3) to manage and control distribution of promotional content in connection with one or more marketing, advertising and/or CRM campaigns.

The content provider 10 may reserve, program, and/or book a message delivery campaign via a user interface (explained further with reference to FIG. 3 and implemented as, for example, a web interface) for CMS 20. Further, the content provider 10 may also define a set of rules governing and related to the delivery of promotional content to a plurality of users (via subscriber terminals 90, 95 and/or VoIP clients 50, 55). As part of such a message delivery campaign, promotional content may be distributed to the one or more of the plurality of subscriber terminals 90, 95, which may be, for example, mobile devices or other devices capable of sending and receiving data and text messages and outputting such messages to the device users. Further, the promotional content may be distributed to one or more of the plurality of VoIP clients 50, 55. Such promotional content may include information in the form of data, text, pictures, audio, video, HyperText Markup Language (HTML), extensible Markup Language (XML), extensible HyperText Markup Language (XHTML). The content provider 10 may also indicate instructions and/or rules indicating what, when and how to send promotional content, details regarding which users should receive promotional content (e.g., characteristics of device users included in a target group or groups for the message delivery campaign), in which format (e.g., SMS, IM, electronic mail, MMS, WAP Push, Web pages, digital object, etc.), a target price level for the message delivery campaign, demographics of the target audience, duration of the message delivery campaign, etc.

Each of the subscriber terminals 90, 95 can be implemented as a mobile phone, lap top, PDA, multimedia computer, smart phone, etc. Accordingly, although not illustrated, it should be understood that a subscriber terminal 90, 95 may include a processor connected to a user interface, computer readable memory and/or other data storage and a display and/or other output device. Terminals 90, 95 may have capability to communicate with one or more different types of communication networks and have messaging capabilities including, e.g., a SMS client, electronic mail client or MMS client embedded in the terminal. Terminals 90, 95 may also include a browser (not shown) configured to access Web and/or WAP services.

Since the costs associated with communicating via a packet-based network are lower than communicating via a conventional cellular network, it will be appreciated that content providers can contact the recipient via IP, e.g., VoIP, at a lower cost than may be required for such communication via communication network(s) 40. Embodiments of the invention capitalise on this differentiation, and at least one embodiment may be implemented to provide subsidized or free communications and/or data services to users by rerouting circuit-switched originating calls and/or data traffic to recipients via VoIP.

It should be appreciated that software and functionality implemented via firmware or hardware associated with the VoIP client 50, 55 can be device and transport independent. Thus, all that is necessary is that a client, associated with a recipient, is running a VoIP application and a user of the VoIP client 50, 55 has logged in to a given VoIP service such as Skype, Vonage, Google™ Gtalk, among others. Accordingly, the client application code or instruction may be implemented as standalone software or, for example, downloadable software, or could be implemented using one or more conventionally known web-based solutions. For example, Google™ Gtalk is based on web based approach with no special software necessary in a subscriber terminal since the VoIP application runs via a web browser. It will therefore be appreciated that the term "VoIP client," as used throughout this specification, includes, but is not limited to, any terminal capable of providing VoIP services, for example, a mobile phone with VoIP software, a personal computer or laptop with VoIP software and/or related hardware. Moreover, it should be understood that the subscriber terminals 90, 95 and VoIP clients 50, 55 may be implemented in single devices. As a result, the functionality provided by a subscriber terminal 90 may be combined with the functionality provided by VoIP client 50; accordingly, such a single device may enable communication with a single recipient via either the Internet 45 or one or more communication network(s) 40.

The one or more communication networks 40 may include any type of Communications network including but not limited to a second Generation (2G) network, a 2.5 Generation network, a third Generation (3G) network utilizing GSM, Wideband Code Division Multiplex Access (WCDMA), CDMA, or Time Division Multiplex Access (TDMA), GPRS, Universal Mobile Telephone System (UMTS), etc. Network(s) 40 can also be implemented as a combination of two or more technologies i.e., a hybrid network. Further, communication network(s) 40 may also include generic Internet access using one or more transport methods. Further, the one or more communication networks 40 may also include Local Area Networks (LANs), such as Wireless Local Area Networks (WLAN), BlueTooth (BT) and optionally utilize one or more other technologies, such as WiMax (WorldwideInteroperability for Microwave Access). Communication via the one or more communication networks 40 may be implemented by broadcasting over cellular, broadcasting over DVB-H (Digital Video Broadcasting—Handhelds), ISDB-T (Terrestrial Integrated Services Digital Broadcasting) or DMB (Digital Multimedia Broadcasting).

Figure 2A:
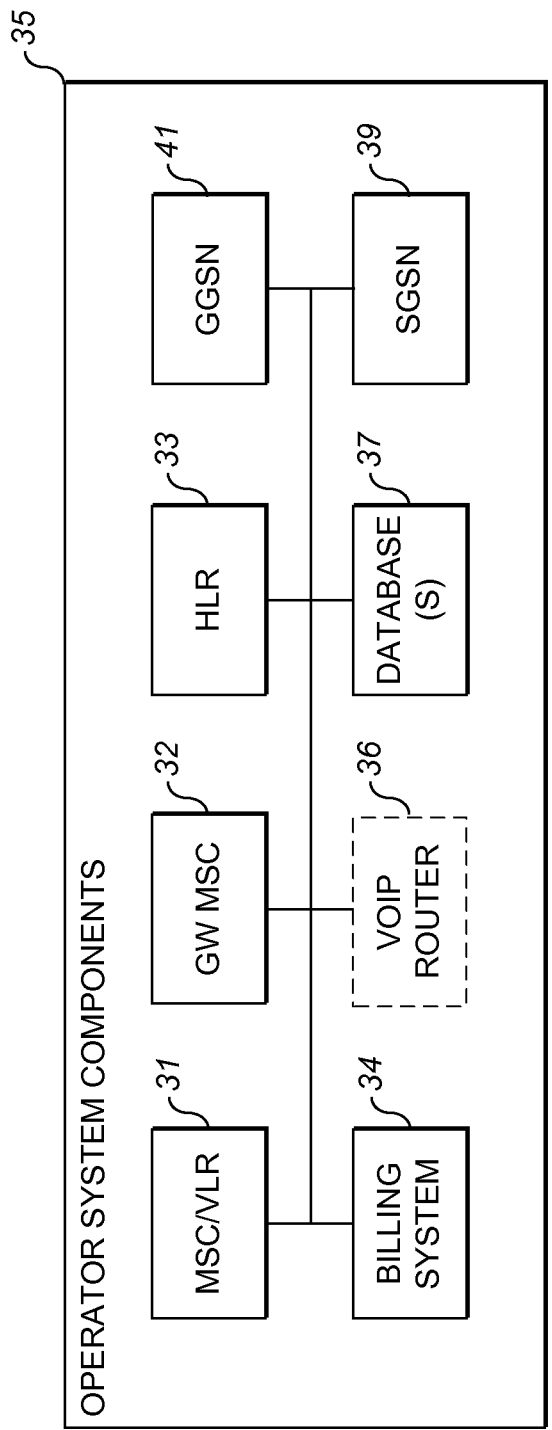
FIG. 2a illustrates additional details included in operator system components provided in accordance with at least one embodiment of the invention.

In at least one arrangement, the communication network(s) 40 may be connected via Base Transceiver Station (BTS) 81 to a Radio Access Network (RAS) included in the one or more communication networks 40. Such a RAS network may include, for example, several BTSs and Base Station Controllers (BTCs); further, such a RAS may be implemented via connection to components located at one or more facilities associated with or controlled by an operator 35, such as a level operator and/or network provider that incorporates or is connected to or coupled to various core network components, for example, and as illustrated in FIG. 2: a Mobile Switch Centre (MSC/VLR) 31, Gateway Mobile Switch Centre (GMSC) 32, Home Location Register (HLR) 33, billing system 34, a Service Control Point (SCP) 38 exemplifying an intelligent network node, a GPRS core network node such as a Service GPRS Support Node (SGSN) 39 and Gateway GPRS Support Node (GGSN) 41, and in at least one embodiment of the invention a VoIP router 36. The VoIP router 36 may include or have access to one or more databases 37, which can store data identifying VoIP client devices, together with the status thereof, as will be described in more detail below.

Gateway 30 may be configured to provide two way communications between the Internet 45 and communication network(s) 40 and may be embodied as a proxy server or firewall server, router and/or switch (not shown). More specifically, gateway unit 30 may be implemented to enable implementation of Internet-based VoIP services within the cellular infrastructure provided within communication network(s) 40. Thus, the gateway unit 30 may be configured to convert a VoIP call to a conventional cellular call (and vice-versa) and may include one or more Foreign eXchange Stations (FXSs) and/or Foreign eXchange Office (FXO) adapters to enable communication from VoIP clients with the communication network 40.

The CMS 20 can be operationally coupled to the communication network(s) 40 either directly or via the Service Delivery Optimization Management System (SDOMS) 60 and the gateway 30. Moreover, communication network(s) 40 may be implemented as, include or be connected or coupled to the Internet 45 via gateway 30 to provide access to various Internet-implemented services. Such services may provide access to web-based information, products, subscription services, etc.

The SDOMS 60 may be configured to coordinate and/or implement rerouting of communication and data transmission via VoIP and also more economically distribute auxiliary content in coordination with the advertisement management system 20. The SDOMS 60 (individually or in combination with gateway 30) may include among other equipment, a central call processor configured to run specialized database/mapping programs that provide soft switch functionality. The SDOMS 60 can be implemented as an Intelligent Network (IN) Service Control Point (SCP), in which case call set-up is handled in accordance with conventional IN procedures, which is to say that the MSC/VLR with which a subscriber of the SDOMS 60 service is registered stores triggers that cause call control to pass to the SCP during call set up. Alternatively, the SDOMS 60 can be implemented as a bespoke node in the network, and call set-up signalling messages routed thereto in a bespoke manner, either by coupling operation of the SDOMS 60 with a HLR 33 (when the recipient is a subscriber of a network having access to services and components associated with licensed operators) or simply by routing calls of a specified type (such as IP calling numbers) to the SDOMS 60 and gateway 30 (when the recipient is a subscriber of a network providing only IP services).

Irrespective of the implementation, the SDOMS 60/gateway 30 may be considered an intermediate network element that reroutes phone calls originating from a PSTN or a wireless network to an endpoint via VoIP technology. The SDOMS 60 has access to one or more databases 65 arranged to store data related to redirection of transmitted voice and data and/or distribution of promotional content to one or more recipients (e.g., network addresses of VoIP clients 50, 55; mapping to subscriber terminals 90, 95, etc.; data indicating relationship history such as orders, offers, and other customer information). It will be appreciated that rerouting of circuit-switched voice calls may include an additional step of digitization to switch to packet-switched rerouting. Moreover, additional or alternative operations may be performed for interception and/or rerouting of circuit-switched calls.

The SDOMS 60 may communicate with the VoIP clients 50, 55 via the gateway 30, and also with a VoIP Private Branch eXchange (PBX)/VoIP proxy 70, which may be connected or coupled to the Internet 45. As a result, one or more VoIP clients 50, 55 may be coupled to the VoIP PBX 70 (and the CRM 60) via the Internet 45. The VoIP PBX 70 may be implemented in various ways, for example, as a telephone exchange that serves a particular business, office or subset of service subscribers, or one that a common carrier or telephone company operates for many businesses or for the general public. Moreover, the VoIP PBX 70 may support packet switched networks for data as well as supporting VoIP telephone calls via the Internet as a global delivery system. Such a configuration is particularly well suited to SIP-based implementations, in which the status of VoIP clients 50, 55 is maintained by a VoIP PBX 70, and in which the status of a VoIP client 50, 55 is determined by the SDOMS 60 via the VoIP PBX 70. In this configuration, the subscriber data defining some VoIP services available to the subscriber can be stored in a service database 75 while others are specified in database 65 as described above.

As mentioned above, at least one embodiment may be implemented to provide subsidized or free communications and/or data services to users by providing connection to recipients via VoIP. For example, a subscriber may have subscribed to a service, referred to below as a rerouting service, in which service at least some of recipient's incoming calls are routed to the recipient VoIP client.

Regardless of how a voice call originates, when the call is rerouted according to at least one embodiment, a request may be sent to the SDOMS 60 asking which endpoint (e.g., phone number, VoIP address, etc.) is associated with a dialed phone number and what the endpoint's current IP address is. In response the SDOMS 60 accesses the database 65 and queries the store in respect of the dialed number. It should be appreciated that, if a soft switch 60 does not have access to the information it needs to reroute a call, the soft switch may hand off the request downstream to other soft switches until it finds one that can answer the request. Once the called party is located, the party's current IP address is identified thereby allowing the exchange of data between two endpoints.

In a first arrangement the rerouting service is an optional service provided by a licensed network operator; accordingly the functionality provided by the SDOMS 60 may be incorporated into the operator system components 35 described above with reference to FIG. 2a. In such an arrangement, a recipient may subscribe to the operator's own VoIP routing service using a web interface (not shown) via which subscriber can enter their preferred VoIP service providers and their identifications in such services to a database (e.g., database(s) 37 illustrated in FIG. 2a). For example, such information stored in the database may include the user's MSISDN number with, for example, their VoIP address, Skype™ ID, SIP-based VoIP ID, etc. Moreover, the subscriber can select a notification mechanism in the event that a rerouted call cannot immediately be connected to their VoIP client. Example notification mechanisms include SMS messages, and the notification service would involve the SDOMS 60 rerouting calls in conjunction with the sending of an SMS message to a subscriber cellular terminal 90 that the there is a rerouted VoIP call waiting for them on their VoIP client 50. In such an implementation, the SMS message might also include promotional material, which can be selected by the SDOMS 60 from the content management system 20.

Alternatively, if the rerouting service is being provided by a third party such as a provider of IN services, the recipient may subscribe to the third party service, again via a web interface, and the data entered therein be stored in the database 65 illustrated in FIG. 1.

In order to facilitate subsidized or free communications based on the routing of VoIP calls, the SDOMS 60 (or gateway 30) stores, in the database 65, data identifying the originator of the call (in particular the operator with which the originator is associated) and data identifying the called party (the identifier corresponding to the called party's VoIP subscription), together with a timestamp in identifying the start and end time of the call. If a call is identified to originate from external network, part of the terminating revenues can be shared with the called party i.e. the subscriber receiving this VoIP service routing. Such revenues for the subscribers can be credited to users using for example the billing system 34 or other debit/credit systems. In particular, air time can be credited to a pre-pay account associated with this subscriber via his subscriber records. The amount of credit, in terms of money or resource usage, that is applied to a subscriber record can be one off payment for each received VoIP call, or it can be based on the duration of the call, or it can be based on the identity of the operator with which the called/calling party is associated.

Figure 2B:
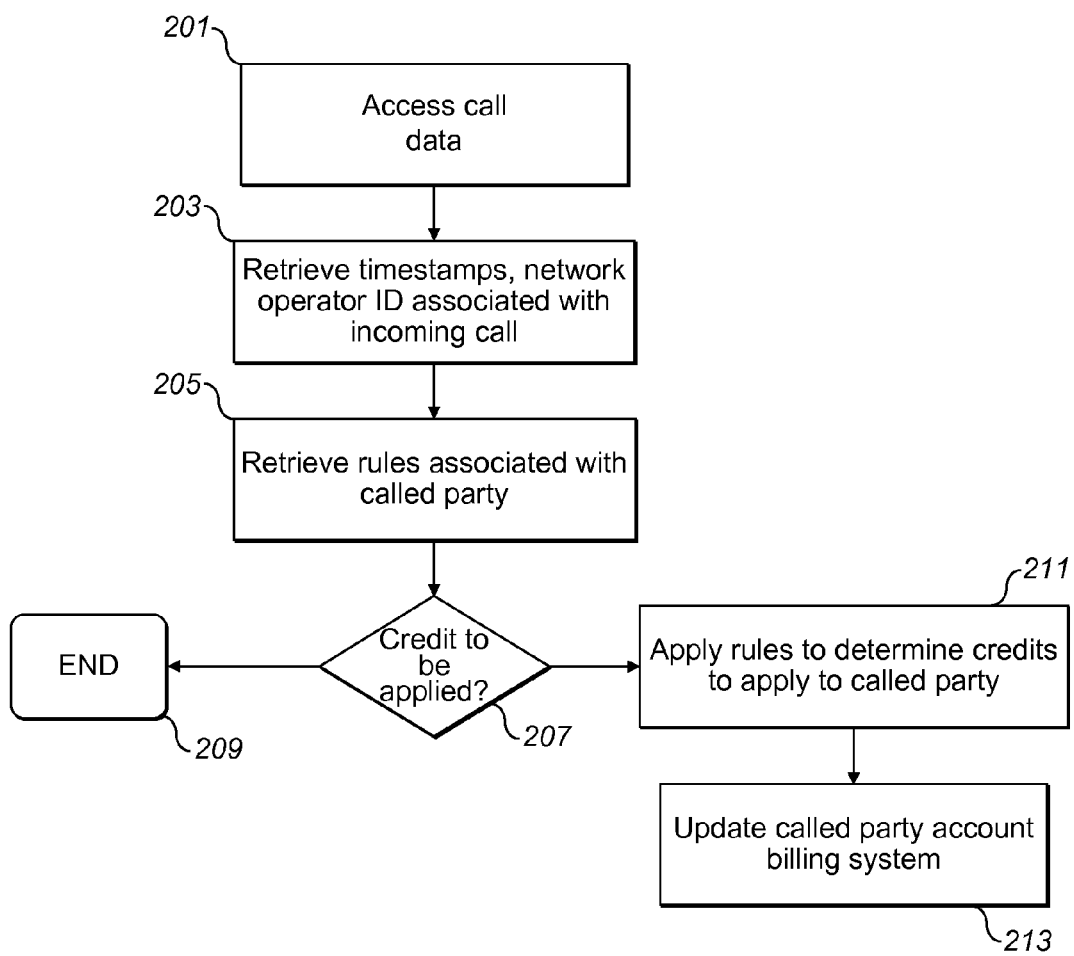
FIG. 2b is a schematic flow diagram showing steps associated with crediting the account of a called party according to an embodiment of the invention.

Turning to FIG. 2b, the timestamps stored by the SDOMS 60 are analysed either in real time, periodically (such as once hour, day, week etc) or randomly (steps 201, 203), and the SDOMS 60 retrieves (step 205) and applies a set of rules to the stored call data in order to determine whether, and if so how, to apply credits to the called party (step 207, 211). As an example, a call originating from a subscriber of operator ABC might be credited as a single time "connecting" bonus of 0.01 €, while a call from a subscriber of a different operator CBA could be credited as a time based credit of 0.02 €/minute. These credits could alternatively be implemented as amounts of free air time or texts, for example a call originating from operator ABC could generate 50% talk time based on the timestamp of the completed call, i.e. for example 2 minutes of received VoIP call could result in 1 minute of air time to be credited to the called party, which can be used in calls made from the subscriber to operator ABC. As an additional alternative, any given VoIP recipient could be credited with a combination of a connecting bonus and time based and free text and air time. Irrespective of the type of credit to be added to the called party's account (as determined by the rules applied at step 211), at step 213 the account of the called party is updated to account for the credit.

Thus, when a call or other data transmission originates from within a network other than the recipient's home network, part of a termination fee relating to the call or data transmission that was routed and handled using VoIP connectivity may be credited to the subscriber who received the call/data transmission using the VoIP connectivity. Such mobile termination fees are the result of the wholesale charge that one mobile carrier pays to another company for each call, in order for the call made by a subscriber of the first company to terminate at the network of the second company. The retail price that the subscriber pays is the sum of the mobile termination rate and an additional fee that is set by the telecommunications company from which the call originates. Thus, in accordance with at least one embodiment of the invention, the use of VoIP connectivity may not only be used to reduce the cost of providing services to customers but may also be used to provide credit to subscribers.

A second implementation of the rerouting service will now be described. This arrangement applies particularly to operators such as a Mobile Virtual Network Operator (MVNO), of a type which does not issue Subscriber Identity Modules (SIMs). For such an operator, the only type of traffic that can be transmitted to subscribers is IP traffic. In this arrangement the rerouting service is a thus an intrinsic service offered by the operator, and subscribers may receive calls/data transmissions only if he/she is online with one or more VoIP clients that have been registered with the SDOMS 60. This arrangement could also apply to a UMA or WiFi network provider.

In a third arrangement, the rerouting service can also be an intrinsic service provided by the operator, but unlike the second arrangement, it can be applied in relation to operators that have the capability to route call traffic as circuit-switched traffic in addition to routing it as packet-switched traffic. In this arrangement the operator can select transport mechanisms, and is thus well suited for use by MVNO operators which issue SIM cards (since a MVNO may reduce its costs by providing connectivity for some or all of the data to be transmitted to its customers via VoIP rather than using the capacity purchased from licensed operators). This third arrangement is similarly applicable to licensed network operators.

In addition to providing a rerouting service for rerouting calls, an operator can provide a rerouting service for data traffic: for example, a recipient may subscribe to a service in which at least some or all of the SMS/MMS messages sent to the recipient are rerouted to the recipient's e-mail address. Whilst this service applies to all three arrangements described above, such a service may be particularly useful in the second arrangement, namely one in which an operator provides SIM-less services only.

In relation to the first and third arrangements, rerouting of call and/or data traffic may be selectively performed on the basis of the status of the recipient, e.g., if a recipient subscriber is roaming (thereby potentially requiring higher fees or receiving data). Accordingly the status of a subscriber's VoIP client, as well as their subscriber terminal connection, may be monitored to determine how and where to send incoming voice and data transmissions. This information would be accessible from the SDOMS database 65 or the VoIP database 37, depending on whether the operator or a third party is providing the rerouting service. Furthermore, in relation to the first and third arrangements, rerouting of voice calls to VoIP may be performed depending on whether a recipient has indicated a preference for calls to be routed to their VoIP client as opposed to their GSM client. Accordingly, the rerouting service can be implemented to include some degree of call forwarding functionality.

Figure 3:
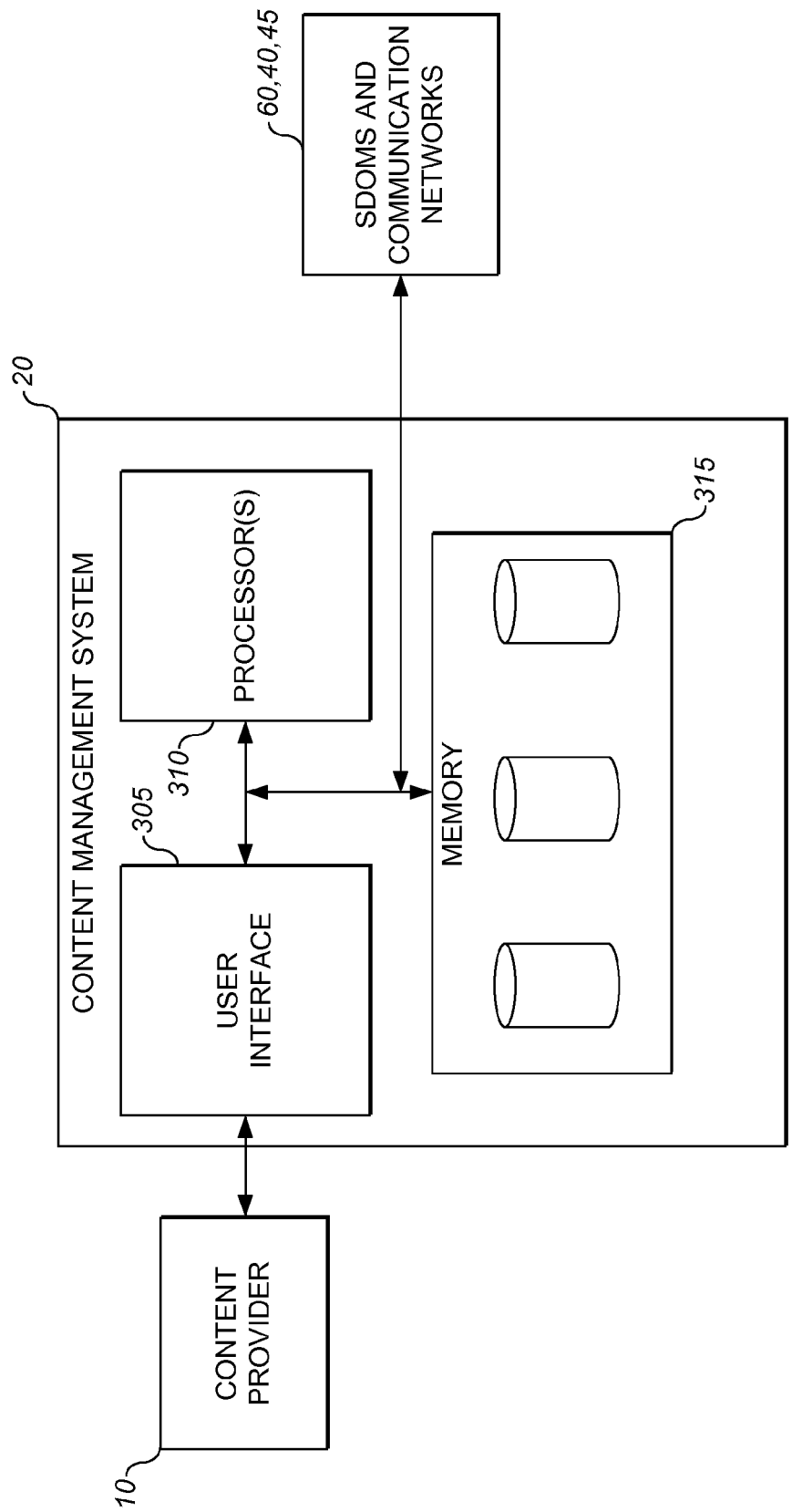
FIG. 3 illustrates additional details included in an advertisement management system provided in accordance with at least one embodiment of the invention.

The rerouting services described above can additionally include selection and delivery of content to recipient and/or originating user's terminal during initiation of a rerouted VoIP communications session. Such content may be retrieved by the SDOMS 60 from the content management system 20, and transmitted at the start or end of the rerouted packet data. Alternatively the SDOMS 60 can schedule delivery of the selected content to occur after the rerouted VoIP session has ended (but while the VoIP client is still on line). In this latter arrangement the sending of content is somewhat independent of the rerouting service, but it is nevertheless triggered by the rerouting service. FIG. 3 illustrates one example of the components of the CMS 20 in more detail. The CMS 20 may include one or more processors 305 operationally coupled to a user interface 310, computer readable memory and/or other data storage 315. Accordingly, computer executable instructions and data used by the processor(s) 305 and other components within the CMS 20 may be stored in the computer readable memory included the CMS 20. Further, software may be stored within the memory and/or storage 315 (coupled to the processor(s) 205 and user interface 310) to provide instructions to the CMS components for enabling the system 20 to perform various functions.

Preferences, settings, and content and/or other rules of distributing promotional content may be stored in the data storage 315. The content may be commercial, e.g., product or service promotion or non-commercial messages such as general information services, while the rules indicate preferences specified by the content provider 10 in relation to the format and timing of content delivery. For example, the CMS 20 may be configured to receive promotional content (e.g., audio, video, text, graphics, font type, font color, etc.) and format of the advertising content (e.g., MMS, EMS, SMS, WAP push, etc.) associated with marketing and/or message delivery campaigns as well as other details regarding distribution of such promotional content via the user interface 310. Subsequently, that information may be stored in one or more databases included in the computer readable memory and/or other data storage 315. Accordingly, the user interface 310 may be configured to enable a content provider 10 or other entity to interact with components of the CMS 20 as well as other systems coupled to the system 20 to manage and control distribution of promotional content and analysis of responses thereto as part of one or more marketing, advertising or customer relations campaigns. Accordingly, the user interface 310 may be implemented as a web-based user interface provided by software stored in the memory 315 or running on one or more servers associated with or supporting the CMS 20.

Figure 4:
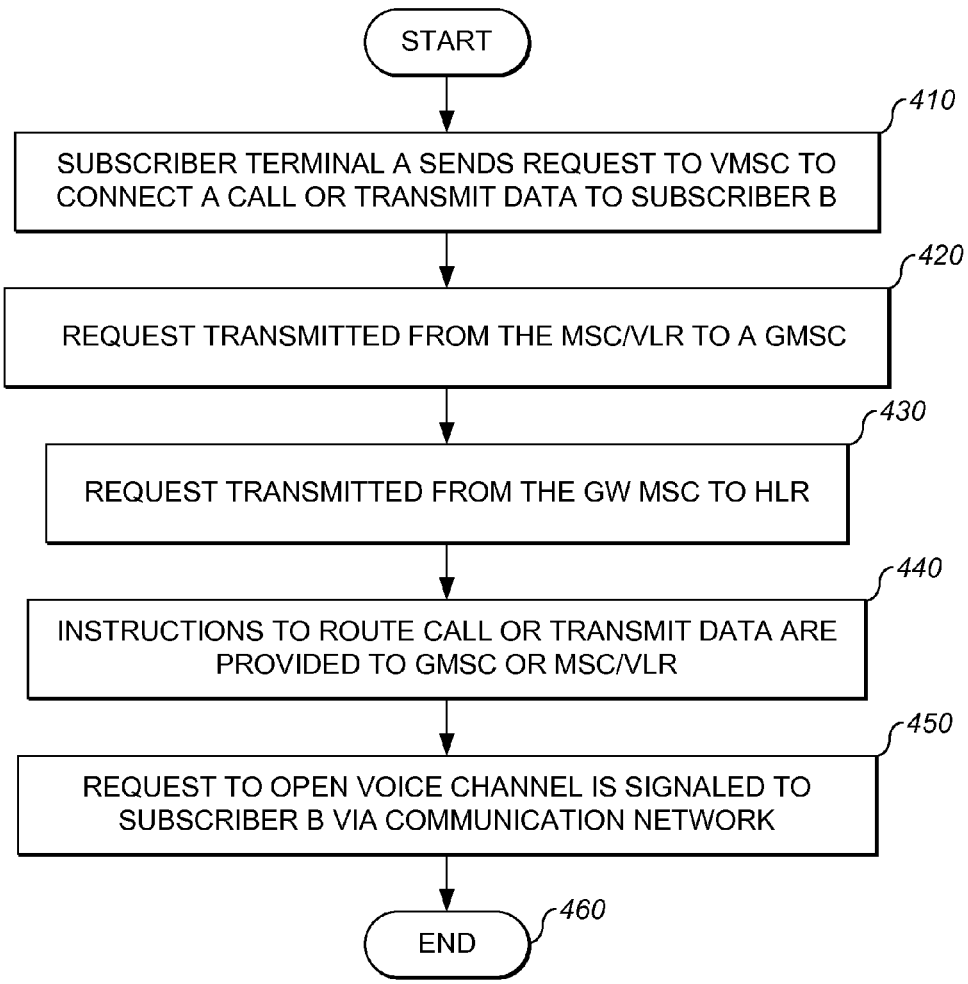
FIG. 4 illustrates conventional method operations performed in association with call signalling.

The steps involved in conventional call set-up will now be described with reference to FIG. 4. At step 410, a subscriber terminal A sends a call set-up request to MSC/VLR 31 to connect a call or transmit data of one or more various types to subscriber B. As part of the call set-up process, the request is transmitted from the MSC/VLR 31 to the HLR 33 via the gateway switch GMSC 32 (steps 420, 430) with a request for the network location of the called party, subscriber B. Routing instructions to route the call or transmit data are provided to the MSC/VLR 31 via the GMSC 32 (step 440). Control then proceeds to 450, at which a request to open voice channel is signaled to the subscriber B via some means of communication network. Control then proceeds to 460 at which operations end. Additionally, it should be appreciated that, in accordance with conventional methods, a subscriber A's pre-paid or post-paid balance is checked before, during and after a call or data transmission to ensure if there is sufficient credits to complete the call or data transmission. In some cases also the balance of subscriber B may also be checked.

Figure 5:
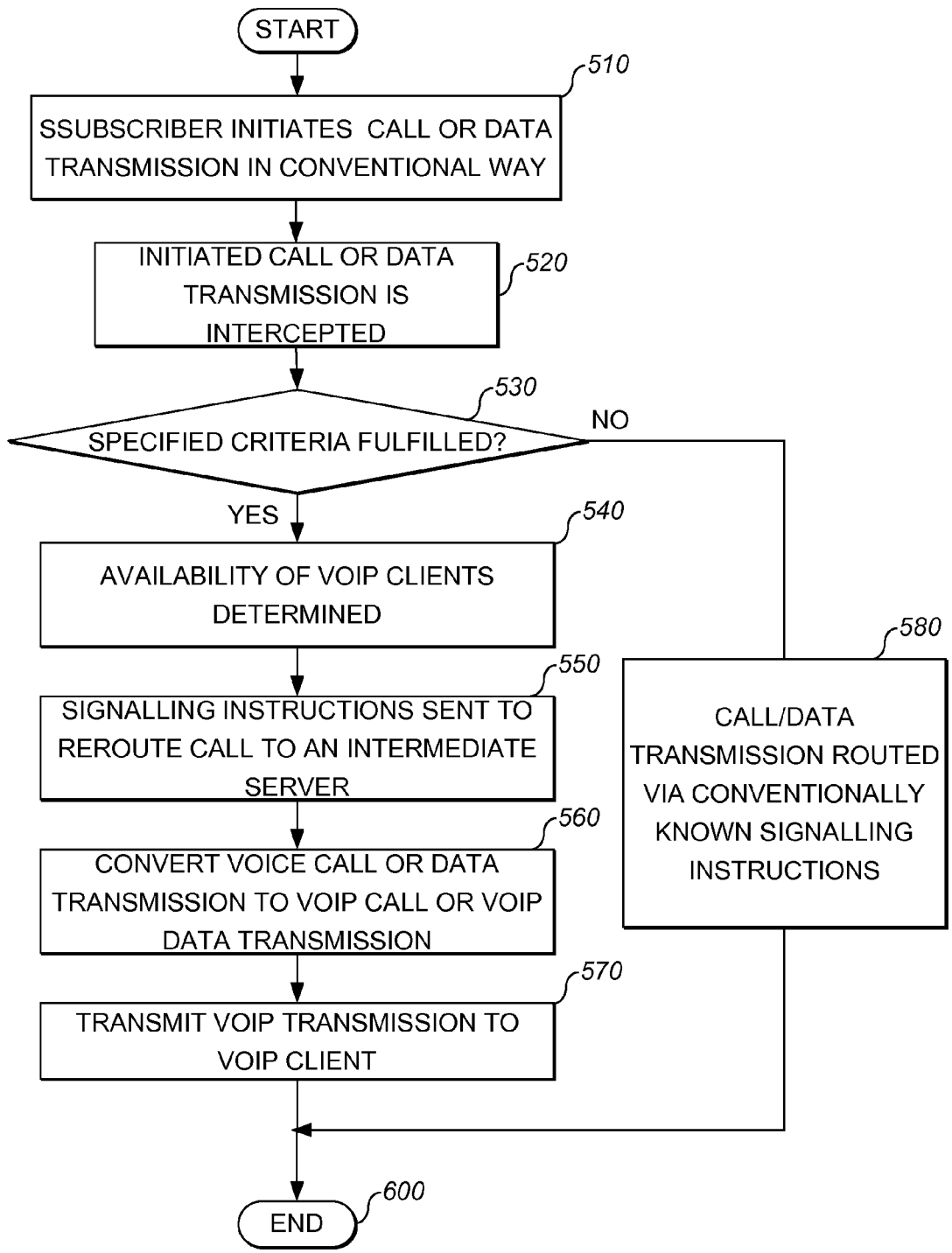
FIG. 5 illustrates examples of method operations performed in conjunction with at least one embodiment of the invention.

FIG. 5 illustrates an example of call signalling operations according to an embodiment of the invention, specifically corresponding to the first arrangement described above for the case in which the rerouting service SDOMS 60 is implemented as an Intelligent Network service (e.g. via SCP 38), and where it is assumed that the subscriber B has signed up to the rerouting service. At step 510 subscriber A initiates a call or data transmission. The initial parts of the call set-up are handled per steps 420, 430, and enable the MSC/VLR 31 to identify a terminating switch associated with subscriber B and sets up a voice circuit within the switching network. Once the connection request has been received at terminating switch, and on the basis of terminating trigger data held by the VLR in the terminating switch in respect of subscriber B, the terminating switch is triggered to send a signalling message to the SCP 38 (SDOMS 60). The SCP 38/SDOMS 60 can be considered to have intercepted the call set up: having gained control of the process, the SDOM 60 reaches a determination as to whether specified criteria are fulfilled (step 530). Such criteria may be, for example, that subscriber B has subscribed to a service (e.g., "VoIP my GSM" service in which all calls/data transmissions are by default first tested via VoIP connection to the recipient's VoIP client) based on the presumption that subscriber B has subscribed to a "VoIP my GSM" type service, thus, indicating willingness to receive some or all calls or data transmissions via VoIP. The process then goes onto determine the availability of the VoIP clients listed for subscriber B (step 540), since the criteria reviewed at step 530 may include that the subscriber's VoIP client is both active and connectivity is of a satisfactory level to enable rerouting of voice or other data transmission to the VoIP client.

It should be understood that, although determination of the availability and connectivity levels of VoIP clients may be performed as illustrated in FIG. 5 (following initiation of a call), availability of a recipient's VoIP connection could be performed, and stored in the relevant database (37 and/or 65) in practice before the call/data transmission initiation or at various times within the method operations illustrated in FIG. 5, e.g., to provide a real time or close to real time account of which VoIP clients are active. Such an optimized database could be populated by receipt of presence updates from VoIP service providers. It should also be appreciated that operations performed at 540 may be performed, for example, at one or more intermediate servers (e.g., MSC\VLR, GW MSC, VoIP router, HLR, etc.).

If the criteria forming the basis of the evaluation at step 530 are not met, control proceeds to 580 at which the call/data transmission is routed from the SCP 38 via conventionally known signalling instructions to Subscriber B's cellular mobile terminal via the terminating switch. Control then proceeds to 590 at which operations end. In relation to the second implementation of the rerouting service (where calls are made and routed to IP calling numbers (subscribers with SIM-less client devices)), step 520 involves intercepting a call setup request at the SDOMS 60/gateway 30; since the only device to which incoming calls can be directed is a VoIP client, if the determination at step 530 is negative, then unless the subscriber B has a subscription with another operator, whose details are separately accessible to the SDOMS 60 (per the third implementation), the call set up attempt will terminate completely.

Assuming one or more VoIP clients to be available, control then proceeds to step 550, at which signalling instructions are sent to route the call to an intermediate server, e.g., one implemented in a network element (for example, gateway 30 operating in conjunction with SDOMS 60 illustrated in FIG. 1) that can convert the voice call or data transmission to a VoIP call or VoIP data transmission. It should also be appreciated that operations performed at 550 may be performed, for example, at one or more intermediate servers (e.g., at the VoIP router, etc.). Control then proceeds to steps 560, 570 at which the voice call or data transmission is converted to VoIP by e.g. the gateway 30, and the converted data are transmitted either via the GGSN/SGSN components 39, 41 of a licensed cellular operator or via the IP Access Points of an IP-only MVNO or UMA operator. Control then proceeds to 590, at which the operations end.

It should therefore be appreciated that, in at least some embodiments, when Subscriber A calls Subscriber B's mobile terminal telephone number, Subscriber B may be able to answer the call using a VoIP client in his/her mobile terminal.

Additionally, it should be understood that the operations illustrated in FIG. 5 are directed to an example wherein Subscriber A is attempting to communicate with Subscriber B; however, depending on preferences of Subscriber B, a call from Subscriber A might be rerouted to Subscriber B's personal computer (in case of VoIP client being active PC).

It should be appreciated that, for the purposes of caller ID, an originating call indicator, may for example, be either some name or number associated with the gateway 30 or it could be a name or number associated with Subscriber A or other indicator set by Subscriber B.

As described briefly above, when implemented in conjunction with the CMS system 20, subscribers of a service and/or originators of calls to such subscribers may receive auxiliary content in conjunction with, or in addition to, a rerouted call. Such content may include voice data communicated to a recipient either via a recorded message or by an individual. Further, it should be appreciated that the auxiliary content may include interactive functionality or elements that enable remote detection of when and how a user has interacted with the promotional content, e.g., when a corresponding electronic mail, SMS, IM, or MMS message has been opened, viewed, or responded to. Thus, in accordance with at least one embodiment of the invention, the CMS 20 may be configured to operate as a mechanism for receiving content and instructions on distributing content to recipients, whereas the SDOMS 60 may be configured to interact with the CMS 20 to receive such content and manage the delivery of such content via the Internet 45 and communication network(s) 45 via gateway 30.

Such auxiliary content may be selected by various other schemes to ensure that the content is acceptable, persuasive and/or of interest to the recipients. Therefore, content may be selected by various schemes including, e.g., combining device user profiles (which may indicate, for example, information about the recipient's geographic location, demographic information including age, gender, interests, etc) and preferences with advertisers' target profiles (e.g., demographic information provided by a content provider regarding target audience for promotional content and delivery preferences). Additionally or alternatively, matching content may also or alternatively be identified by a round robin scheme, first reserve first serve, randomly etc.

Additionally, a history of auxiliary content transmitted to a recipient may be stored and archived (e.g., in memory 215 of CMS 20 illustrated in FIG. 3). As a result, an understanding of interests of a particular user/subscriber could be gained and used to enhance relevance of auxiliary content transmitted to the subscriber (e.g., archived content indicates that a subscriber is interested in horror movies, is interested in foreign films, is interested in music concerts, etc.) Further, analysis of auxiliary content to be transmitted may be performed in whole or part using special application software running in a mobile device.

Additionally, as explained above, in accordance with at least one embodiment of the invention, costs for cellular phone services and/or VoIP services may be free or subsidized based on user interaction with distributed auxiliary content provided via VoIP (for example to reduce costs to the advertiser). Such services may include one or more voice services (i.e., making and receiving phone calls), messaging services such as SMS, MMS, using data services such as Internet browsing or WAP browsing, making video calls, downloading content, streaming content, purchasing applications such as games or other software, using location services, finding information, communicating with a group of people (e.g., multicast communication), etc.

Moreover, although not specifically illustrated or discussed above, one or more of the above-described components (e.g., CMS 20 illustrated in FIGS. 1 and 3) or additional elements may be included in the network 100 that operate or cooperate to identify a correlation between the accessing of a particular content service from a VoIP client or mobile terminal and the transmission of content including a hyperlink. In such an implementation, a "click-thru" type of billing model for distributing content would, therefore, be feasible. Additionally, such an implementation may also enable a business or pricing model wherein, services provided via one or more networks may be provided to a user at a reduced, free or subsidized rate.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

For example, although not discussed in detail, it should be understood that, in accordance with at least one embodiment of the invention, voice call or data transmission may be rerouted using one more alternative communication networks 47 under the direction of the SDOMS 60 illustrated in FIG. 1 in cooperation with gateway 20. Therefore, if it is determined that the a recipient is interested in receiving data via VoIP or another alternative network but a VoIP is not active or connectivity is not sufficient for transmission, at least some invention embodiments may enable transmission of data to the recipient via one or more alternative communication networks 47. Such networks may include cellular, private IP networks, PSTN, etc.

Additional Details and Modifications

With regard to the subscriber terminals 90, 95, it will be readily appreciated that these may also include a battery, speaker and at least one antenna. The user interface may further include a keypad, touch screen, voice interface, one or more arrow keys, joy-stick, data glove, mouse, roller ball, touch screen or the like. Accordingly, computer executable instructions and data used by a processor included in a subscriber terminal 90, 95 and other components within a mobile device may be stored in the computer readable memory included in the subscriber terminal 90, 95. Further, the memory may be implemented with any combination of read only memory modules or random access memory modules, optionally including both volatile and non-volatile memory. Further, software may be stored within the memory and/or storage to provide instructions to the subscriber terminal's processor for enabling the mobile device to perform various functions. Alternatively, some or all of the device computer executable instructions may be embodied in hardware or firmware (not illustrated).

Although not illustrated, it should be understood that VoIP clients 50, 55 may include a processor connected to a user interface, computer readable memory and/or other data storage and a display and/or other output device. Additionally, computer executable instructions and data used by a processor included in the VoIP client may be stored in the computer readable memory included in the hardware associated with the VoIP client. Further, the memory may be implemented with any combination of read only memory modules or random access memory modules, optionally including both volatile and nonvolatile memory. Further, software may be stored within the memory and/or storage to provide instructions to the processor for enabling performance of various functions. Alternatively, some or all of the device computer executable instructions may be embodied in hardware or firmware (not illustrated).

In addition, in accordance with at least one embodiment of the invention, there is no need for a subscriber to own the terminal where the VoIP client application is running. This implementation has particular utility where a user might log into VoIP services, for example, in a web cafe, and is accordingly of most relevance to the second implementation.

As for terminals 90, 95, VoIP clients 50, 55 may have the capability to communicate with one or more different types of communication networks. Thus, although a VoIP client 50, 55 may communicate via IP (electronic mail or VoIP), it should be understood that the VoIP client may have other messaging capabilities including, e.g., a SMS client, and/or a MMS client.

The one or more communication networks 40 can also include any other type of network of interconnected devices or device networks, e.g., interconnected computers or computer networks. Accordingly, it should be understood that the one or more communication networks 40 can also be a combination of a plurality of different types of networks forming one or more hybrid networks.

It should be appreciated that the functionality and operations performed in conjunction with rerouting a mobile call can differ significantly. More specifically, PSTNs usually include at least some circuit-switched portion, wherein a connection remains open and constant between a called and calling party; however, more PSTNs are incorporating packet-switching technology. By contrast, mobile IP networks are routinely structured exclusively around packet-switching technology wherein connections are open long enough to send packets of data as they are needed. Because of the differences between circuit and packet switched technology, the rerouting and implementation of VoIP in such networks is somewhat different. Thus, when a call or data transfer is initiated via a PSTN, the call is routed through the switch at the caller's local carrier to the called party and a connection is made between caller and the other party's line using several interconnected switches or via a dedicated fiber optic path along the way. Alternatively, a PSTN call may, following digitization of the voice payload, be transmitted as packet traffic.

Accordingly it should be understood that some or all of the functionality provided by the operator system components 35 may be provided by various types of network switching subsystem components, which may be one or more components of a GSM system that carries out switching functions and manages the communications between mobile phones and the PSTN. Accordingly, the components 35 may be owned and deployed by one or more mobile phone operators and allow mobile phones to communicate with each other and telephones in a wider telecommunications network. The architecture of such network switching subsystem components resembles a telephone exchange, but there are additional functions which are needed because the phones are not fixed in one location. Each of these functions handle different aspects of conventionally understood mobility management. Such network switching subsystem components also include what is conventionally known to be the GSM core network, which may include a circuit-switched core network, used for traditional GSM services such as voice calls, SMS, and Circuit Switched Data calls as well as an overlay architecture on the GSM core network to provide packet-switched data services, which allows mobile phones to have access to services such as WAP, MMS, and Internet access. Thus, it should be understood that some or all of the components 35 that are used to implement the redirection of mobile network calls to a recipient via a VoIP client may be provided in any type of such network switching subsystem components regardless of ownership or operation.

It should be appreciated that some or all of the functionality of the SDOMS 60 and the CMS 20 may be implemented together or separately and/or remotely in any number of variations so as to provide the ability to either or both redirect communication and data transmission via VoIP and cost effectively control the distribution of promotional content to recipient/customers over VoIP in a manner requested by one or more advertisers. Accordingly it should be understood that some or all of the operations illustrated in FIG. 5 may be performed by, for example, a SDOMS system (such as SDOMS system 60 illustrated in FIG. 1) acting individually or in cooperation with an CMS (such as CMS system 20 illustrated in FIGS. 1 and 3) and a network element implemented as a gateway (e.g., gateway 30 illustrated in FIG. 1) and all or part of various components provided by network operations (such as the operator system components 35 illustrated in FIG. 1).

It should also be understood that the VoIP PBX 70 illustrated in FIG. 1 may be replaced by or combined with an IMS server or some portion of the functionality of such a server. Further, it should be understood that, although the above method descriptions may relate expressly to SMS or electronic mail messaging, at least one embodiment of the invention may be utilized to monitor communication network connectivity of a user following receipt and response to IM or MMS.

It should be understood that the term "auxiliary content" may include various types of advertising material including any one of or combination of text, pictures, audio, video, links to web-sites or other locations of information, telephone numbers, electronic mail addresses, downloadable files including but not limited to audio files including ring tones, songs, etc, computer implemented games, video files, etc. Also, it should be understood that the term "promotional content" includes any type of content provided in connection with mobile marketing, mobile advertising or other material provided for the purpose of persuading mobile device users.

It should be understood that the term "VoIP service" can refer also to video call service.

Although various embodiments of the invention have been described herein that indicate that the transmission of messages are initiated only by subscribers via subscriber terminals such a mobile devices, it should be understood that, in accordance with at least one embodiment of the invention, at least one message may be initiated from a content service. Thus, content may be included in messages sent to subscribers from content services as well as messages from subscribers. Such an implementation may have particular utility where an operator is advertising new services, functionality or service features in an economical way by sending content via VoIP rather than cellular or PSTN.

Additionally, it should be understood that the functionality described in connection with various described components of various invention embodiments may be combined or separated from one another in such a way that the architecture of the invention is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Although the utility of various invention embodiments has been described in connection with the distribution of promotional content, it should be understood that distributed information is not limited to promotional content but may also or alternatively include non-promotional material.

It is to be understood that other embodiments may be utilized and structural and functional modifications may be made without departing from the scope and spirit of the present invention.

Moreover, it should be understood that various connections are set forth between elements in the above description; however, these connections in general, and, unless otherwise specified, may be either direct or indirect, either permanent or transitory, and either dedicated or shared, and that this specification is not intended to be limiting in this respect.

As a result, it will be apparent for those skilled in the art that the illustrative embodiments described are only examples and that various modifications can be made within the scope of the invention as defined in the appended claims.

The invention claimed is:

1. A method of rerouting transmission of data directed to a recipient through a data communications network, the method comprising:

in an intermediate network component, performing operations for:

receiving, via a first network portion of a data communications network, a request for data transmission connectivity to the recipient at a first terminal associated with the recipient, the data communications network further including a second network portion and a third network portion that are coupled between the intermediate network component and the first terminal associated with the recipient, the second network portion being a circuit-switched network portion and the third network portion being an Internet Protocol (IP) network portion, wherein the intermediate network component maintains subscriber records associated with the recipient that include usage records identifying usage of network resources associated with the second network portion and the third network portion;

determining whether the recipient has Voice over IP (VoIP) connectivity that may be used to transmit data to the recipient;

when the recipient has VoIP connectivity, attempting to establish data transmission connectivity with a VoIP client for the recipient;

receiving, via the first network portion, data to be transmitted to the first terminal of the recipient via the second network portion;

when data transmission connectivity is established with the VoIP client, rerouting the data by transmitting data to the VoIP client via the third network portion; and updating the usage record associated with the recipient to indicate transmission of the data via the third network portion instead of via the second network portion; and when data transmission connectivity is not established with the VoIP client, transmitting the data to the first terminal of the recipient via the second network portion.

2. A method according to claim 1, wherein, in the event that data transmission connectivity cannot be established with the recipient's VoIP client, the method further comprises transmitting a notification message to the recipient via the second network portion.

3. A method according to claim 1, wherein the second network portion and the third network portion are operated by the same network operator.

4. A method according to claim 1, wherein the subscriber records include client data identifying said VoIP client and data identifying said VoIP client accessible via the second network portion, the method comprising accessing said client data, whereby to identify whether the recipient has VoIP connectivity.

5. A method according to claim 1, wherein the data transmitted to the recipient originates from a calling party associated with the first network portion of the data communications network, and wherein the method further comprises determining the identity of the first network portion and updating the usage record on the basis of the determined identity.

6. A method according to claim 5, wherein, in the event that said determined identity of the first network portion corresponds to a network other than a home network of the recipient, the method comprises allocating resource usage associated with said transmission of data to the recipient, whereby to update said usage record.

7. A method according to claim 1, wherein the data comprises any one of voice data or a data message having a message body including alphanumeric data.

8. A method according to claim 1, further comprising, upon rerouting the data by transmitting data to the VoIP client via the third network portion, selectively sending an originator of the data transmission a message indicating that the data transmission has been rerouted for delivery to the recipient via VoIP.

9. A method according to claim 1, further comprising providing information to the recipient's VoIP client to enable display of an indication of an identity of the originator of the data transmission on the VoIP client based at least in part on identification information specific to the originator.

10. A system configured to reroute transmission of data directed to a recipient in a data communications network, the data communications network comprising:
    a first network portion;
    a second network portion, the second network portion being a circuit-switched network portion;
    a third network portion, the third network portion being an Internet Protocol (IP) network portion, the recipient being able to receive communications via the second network portion or via the third network portion;
    a gateway element coupled to said second and third network portions so that the second and third network portions are coupled between the gateway element and a first terminal associated with the recipient; and
    a data delivery module coupled to the gateway element, the data delivery module configured to maintain subscriber records associated with the recipient, said subscriber records including usage records identifying usage of network resources associated with the second network portion and the third network portion;
    wherein the gateway element receives, via the first network portion, a request for data transmission connectivity to the recipient at the first terminal associated with the recipient;
    wherein the data delivery module determines whether the recipient has Voice over IP (VoIP) connectivity that may be used to transmit data to the recipient;
    wherein, under direction from the data delivery module, when the recipient has VoIP connectivity, the gateway element attempts to establish data transmission connectivity with a VoIP client for the recipient;
    wherein the gateway element receives, via the first network portion, data to be transmitted to the first terminal of the recipient via the second network portion;
    wherein, when data transmission connectivity is established with the VoIP client, the gateway element reroutes the data by transmitting the data to the recipient's VoIP client via the third network portion, said data delivery module being arranged to trigger updates to the usage record associated with the recipient to indicate transmission of the data via the third network portion instead of via the second network portion;
    wherein, when data transmission connectivity is not established with the VoIP client, the gateway elements transmits the data to the first terminal of the recipient via the second network portion.

11. A system according to claim 10, wherein, in the event that data transmission connectivity cannot be established with the recipient's VoIP client, the data delivery module is arranged to route a notification message to the recipient via the second network portion.

12. A system according to claim 11, wherein the second network portion and the third network portion are operated by the same network operator.

13. A system according to claim 12, wherein the data transmitted to the recipient originates from a calling party associated with the first network portion of the data communications network, and the data delivery module is arranged to determine the identity of the first network portion and to trigger updates to the usage record on the basis of the determined identity.

14. A system according to claim 13, wherein, in the event that said determined identity of the first network portion corresponds to a network other than a home network of the recipient, data delivery module is arranged to allocate resource usage associated with said transmission of data to the recipient, whereby to update said usage record.

15. A system according to claim 10, wherein the data comprises voice data or a data message having a message body including alphanumeric data.

16. A system according to claim 10, wherein, upon rerouting the data by transmitting data to the VoIP client via the third network portion, the system is configured to transmit a message to an originator of the data transmission indicating the rerouting of the data transmission to the recipient's VoIP client.

17. A non-transitory machine readable medium having instructions stored therein, which when executed by a processor in an intermediate network component, cause the intermediate network component to perform a method of rerouting transmission of data directed to a recipient through a data communications network, the method comprising:
    in the intermediate network component, performing operations for:
    receiving, via a first network portion of a data communications network, a request for data transmission connectivity to the recipient at a first terminal associated with the recipient, the data communications network further including a second network portion and a third network portion that are coupled between the intermediate network component and the first terminal associated with the recipient, the second network portion being a circuit-switched network portion and the third network portion being an Internet Protocol (IP) network portion;
    determining whether the recipient has Voice over IP (VoIP) connectivity that may be used to transmit data to the recipient;
    when the recipient has VoIP connectivity, attempting to establish data transmission connectivity with a VoIP client for the recipient;

receiving, via the first network portion, data configured to be transmitted to the first terminal of the recipient via the second network portion;

when data transmission connectivity is established with the VoIP client, rerouting the data by transmitting data to the VoIP client via the third network portion; and when data transmission connectivity is not established with the VoIP client, transmitting the data to the first terminal of the recipient via the second network portion.

* * * * *